United States Patent
Klethi et al.

(10) Patent No.: US 8,914,954 B2
(45) Date of Patent: Dec. 23, 2014

(54) METHOD FOR MAKING A CORE HAVING BUILT-IN CROSS-LINKING FIBERS FOR COMPOSITE MATERIAL PANELS, RESULTING PANEL, AND DEVICE

(75) Inventors: Thierry Klethi, Saint Benoit (FR); Frederic Pinan, Mooresville, NC (US)

(73) Assignee: Saertex France, Arandon (FR)

( * ) Notice: Subject to any disclaimer, the term of this patent is extended or adjusted under 35 U.S.C. 154(b) by 20 days.

(21) Appl. No.: 13/387,423

(22) PCT Filed: Jul. 28, 2010

(86) PCT No.: PCT/FR2010/051601
§ 371 (c)(1),
(2), (4) Date: Jan. 27, 2012

(87) PCT Pub. No.: WO2011/015770
PCT Pub. Date: Feb. 10, 2011

(65) Prior Publication Data
US 2012/0121885 A1    May 17, 2012

(30) Foreign Application Priority Data
Jul. 28, 2009    (FR) ..................... 09 55260

(51) Int. Cl.
*D04H 1/46* (2012.01)
*D04H 18/00* (2012.01)
*B32B 5/16* (2006.01)
*B32B 7/08* (2006.01)
*D04H 1/48* (2012.01)
*D04H 3/10* (2012.01)
*D04H 13/00* (2006.01)

(52) U.S. Cl.
CPC *D04H 18/00* (2013.01); *B32B 5/16* (2013.01); *B32B 7/08* (2013.01); *D04H 1/48* (2013.01); *D04H 3/10* (2013.01); *D04H 13/00* (2013.01)
USPC .......................................................... 28/107

(58) Field of Classification Search
CPC ............ D04H 1/46; D04H 1/48; D04H 3/105
USPC ............ 28/107, 112, 109, 108, 111; 428/113, 428/119, 297.4; 156/148; 442/402, 403
See application file for complete search history.

(56) References Cited

U.S. PATENT DOCUMENTS 2,132,530 A * 10/1938 Greiser ........................... 28/109
2,840,881 A *  7/1958 Bateman ........................ 442/272
(Continued)

FOREIGN PATENT DOCUMENTS

DE    3811778 A1 * 11/1988
EP    0 611 741       8/1994
(Continued)

OTHER PUBLICATIONS

International Search Report dated Feb. 8, 2011, corresponding PCT/FR2010/051601.

*Primary Examiner* — Amy Vanatta
(74) *Attorney, Agent, or Firm* — Young & Thompson

(57) ABSTRACT

A process for the production of a core (10) with integrated bridging fibers (12) for the manufacturing of composite panels, includes producing the following stages: using a cake that is made of light material of the rigid foam type, forming the core (10); depositing excess bridging fibers (12) on at least one surface (18, 20) of the core; making a portion of these bridging fibers (12) penetrate into the core; and removing excess bridging fibers (12) that are not used. The panel that is obtained as well as the associated device are also described.

8 Claims, 3 Drawing Sheets

(56) References Cited

U.S. PATENT DOCUMENTS

Figure 1A:
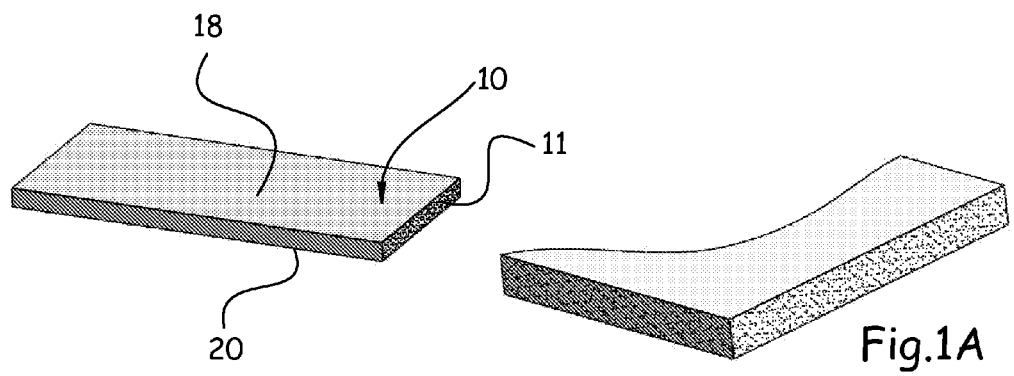
Figure 1B:
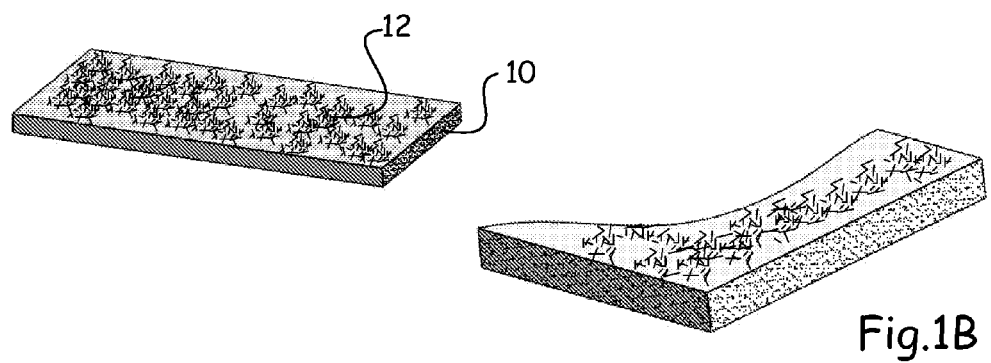
Figure 1C:
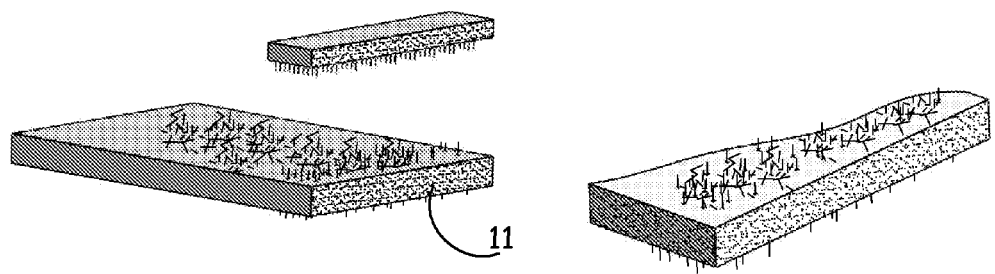

| | | | | |
|---|---|---|---|---|
| 3,059,312 | A | * | 10/1962 | Jamieson ...................... 442/224 |
| 3,122,141 | A | * | 2/1964 | Crowe, Jr. .................... 604/369 |
| 3,395,065 | A | * | 7/1968 | Owen, Sr. ........................ 428/91 |
| 3,451,885 | A | * | 6/1969 | Klein ............................ 442/225 |
| 3,506,529 | A | * | 4/1970 | Sanders .......................... 428/92 |
| 3,591,444 | A | * | 7/1971 | Hoppe ............................ 428/86 |
| 3,839,135 | A | * | 10/1974 | Lowry et al. ..................... 428/93 |
| 3,952,126 | A | * | 4/1976 | Dycks ............................ 442/375 |
| 3,976,525 | A | * | 8/1976 | Mednick .......................... 156/72 |
| 4,047,269 | A | * | 9/1977 | Lochner .......................... 28/109 |
| 4,053,668 | A | * | 10/1977 | Kimmel et al. ................. 428/95 |
| 4,808,461 | A | * | 2/1989 | Boyce et al. ................... 428/119 |
| 5,490,892 | A | | 2/1996 | Castagnos et al. |
| 5,736,222 | A | * | 4/1998 | Childress ...................... 428/119 |
| 6,030,907 | A | | 2/2000 | Ito et al. |
| 6,105,223 | A | * | 8/2000 | Brown et al. .................... 28/111 |
| 7,217,453 | B2 | * | 5/2007 | Johnson et al. ............ 428/292.1 |
| 7,622,408 | B2 | * | 11/2009 | Zafiroglu ...................... 442/402 |
| 2006/0113027 | A1 | * | 6/2006 | Hethcock et al. ............. 156/148 |
| 2007/0254548 | A1 | * | 11/2007 | Meadows ...................... 442/387 |
| 2010/0255251 | A1 | | 10/2010 | Le Roy |

FOREIGN PATENT DOCUMENTS

| | | |
|---|---|---|
| EP | 0 822 062 | 2/1998 |
| EP | 1 686 210 | 8/2006 |
| EP | 1686210 A1 * | 8/2006 |
| FR | 2 921 076 | 3/2009 |
| WO | WO 9503170 A1 * | 2/1995 |

* cited by examiner

METHOD FOR MAKING A CORE HAVING BUILT-IN CROSS-LINKING FIBERS FOR COMPOSITE MATERIAL PANELS, RESULTING PANEL, AND DEVICE

This invention relates to a process for the production of a core with integrated bridging fibers for manufacturing composite panels.

The invention also covers the panel that is obtained as well as the device for producing it.

These panels consist in a known way of a core that is made of light foam-type material, a core on both sides of which two skins are connected.

These skins are integral with each of the surfaces of the core. These are the skins that impart mechanical properties to the panel because of the increase of the moment of inertia by spacing these two skins.

Each of the skins is made integral with the core.

The industry is seeking panels made of composite material with mechanical capacities that are improved by elimination of effects that limit these properties, where said effects are produced by delamination and by the core breaking at its center.

It is therefore necessary to use compatible materials to produce this connection and to compensate for the very poor mechanical properties of the core.

As a matter of fact, each skin is produced from a mat of fibers impregnated in a resin.

It is necessary to provide compatibility between the resin that is used as a matrix and said foam.

Nevertheless, the thus obtained panels have mechanical properties that are limited and that it is possible to increase very significantly.

As a matter of fact, under certain forces, in particular bending, a delamination of one of the skins by disengagement of this skin from the core is noted.

Actually, to increase the resistance to delamination and to fully benefit from the complete resistance of the panel, enhancements have been conceived.

Thus, it is known to produce bridges between the two skins.

These bridges were produced by holes made in the core in such a way that the resin flows through these holes when the skins are produced.

Nevertheless, even if this is an enhancement, the improvement of mechanical performance is inadequate.

As a result, the concept was developed of connecting the skins to the core by running fibers from at least one of the skins through the core either all the way through if one of the skins is involved or by running part-way or all the way through if the two skins are involved.

Thus, the resin can migrate along fibers that run part-way or all the way through and thus form bridges between the two skins that are thus themselves bridges made of composite material.

European Patent EP 1 686 210 describes a composite panel that thus comprises a core with two fibrous skins, whereby these fibrous skins are connected to the core by a solidified binding material, and connecting fibers that are originally from at least one of the skins have been embedded, in particular perpendicularly, in the separating volume between the skins and therefore in the core.

This document also describes a device that makes it possible to produce, continuously and simultaneously, a skin on each side of a core and to make a portion of the fibers of these skins penetrate through the core in a way that may or may not be all the way through, by needle-bonding.

French Patent Application FR 2 921 076 describes an enhancement of the patent mentioned above.

This application provides that at least a portion of the embedded connecting fibers from at least one of the two skins has at least one oblique orientation relative to at least one of the two skins.

Thus, the two skins are connected to one another by bridges that consist of fibers obtained from these two skins.

The drawback of such panels is the selection of fibers. As a matter of fact, it is understood that the fibers that constitute the skins are not necessarily suitable for another use, namely the migration of resin and the "bridging" of skins.

As a matter of fact, the nature, the diameter, the length, and the type of fibers constituting the skins do not generate adequate mechanical properties or a migration power that is fast enough, to cite only the essential parameters.

Finally, not only are the fibers of a unique type but the needle-bonding may prove unsuitable when the thickness of each of the skins varies or the density varies. The combinations are therefore very limited.

There is, however, a demand for products with high mechanical strength, requirements for high speeds of panel production, although the migrating power of resins should also be improved.

The rates are important, but the diversity of requirements is important as well, although it would be advantageous to be able to use cores prepared on the side and skins prepared in advance or produced in situ but thus allowing numerous combinations.

This is one of the objects of this invention, among others, to propose a process for production of a core that includes preconnections, designed to accommodate at least one skin for forming a panel with high mechanical strength and with very high resistance to delamination.

The object of the invention is also a core that is thus obtained by the process and a panel that is produced from this core as well as the device for producing said panel.

The invention is now described in detail according to a particular, nonlimiting embodiment, relative to the drawings that show:

FIGS. 1A to 1D: A view of a block diagram that illustrates the process that is implemented according to this invention for manufacturing a core with a thread reinforcement, FIGS. 2A and 2B: Two views of two panels that are produced from a core that is obtained by the process, FIG. 3: A diagrammatic view of the device that makes it possible to produce the core according to this invention.

The process according to this invention is described relative to the block diagram of FIG. 1. In stage A, this process consists in using a cake 10 that is made of light material, for example a rigid foam with a density of 30 kg/m³, to provide an order of magnitude, which constitutes a core 11. In a known way, this light material cake is a plate of parallelepipedic shape, of several centimeters in height, to provide a simple example. Plate is defined as a single-material or multi-material monolithic plate or reconstituted plate.

During stage B, this core 11 next receives at least one type of bridging fibers 12 on at least one surface, in this case on the upper surface of the core. These fibers are deposited on the surface without any connecting element.

Hereinafter, "fiber" is interchangeably called mono-filament fibers, multi-filament fibers, or else threads.

Hereinafter, a single type of bridging fibers will be mentioned, but there can simultaneously be different types thereof.

These fibers 12 are obtained from, for example, a multiple cut of continuous threads in such a way as to generate fibers of suitable length. There are cutters that make it possible to manufacture these segments of fibers in situ.

These fibers 12 are deposited on the surface in a quantity that is at least equal to the bridging requirements. In this case, these fibers are deposited in a large quantity.

These fibers are adapted to the bridging and can be selected, for example, from among threads in the form of low-grade filament bundles of 6 to 30 μm, or bundles that are of high-grade threads of 30 to 10,000 tex.

Said filaments are connected in such a way that the cutting of this thread leaves the ends of the filaments connected.

The bridging thread can be produced by braiding said bundle of filaments using a connecting thread of the same nature or of a different nature from the material that constitutes the filaments of the bundle, with a winding in a helix, for example, of this connecting thread around said bundle.

This braided thread offers significant advantages, in particular the one of monitoring the quantity of fibers that are introduced and that of improving the migration of resin during its use for the production of panels as it will be explained below. In addition, such a braided thread makes it possible to produce high-quality bridging threads.

During stage C, it is provided to make the bridging fibers 12 penetrate in a way that runs all the way or part-way through the core.

A known and industrially acceptable means for the manufacturing of such products is needle-bonding.

Needle-bonding consists in making needles penetrate through the core 11. Each needle comprises one profile tip that is suitable for ensuring that the bridging threads are driven in the direction of introduction of the needle and for removing the needle without carrying away the threads.

It is also provided that the threads penetrate part-way or all the way through the core, and therefore pass through it.

These threads can be introduced perpendicularly relative to the plane that consists of the surface 18 of the core 11 to which the bridging fibers 12 are connected, but these fibers can be introduced obliquely relative to this surface 18, with the angle being able to be positive or negative or one part with a positive angle and another part with a negative angle within the same core.

The angle varies in particular and commonly between 45° and 90°.

The concept is that the bridging threads can also be introduced according to a predetermined pattern.

Figure 1D:
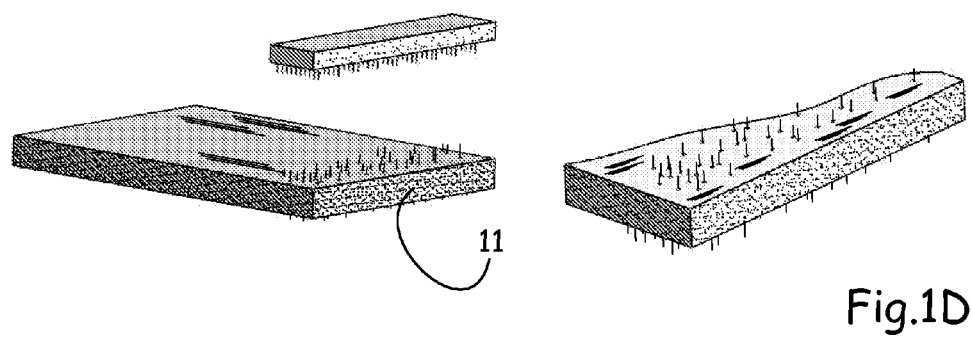
Figure 2A:
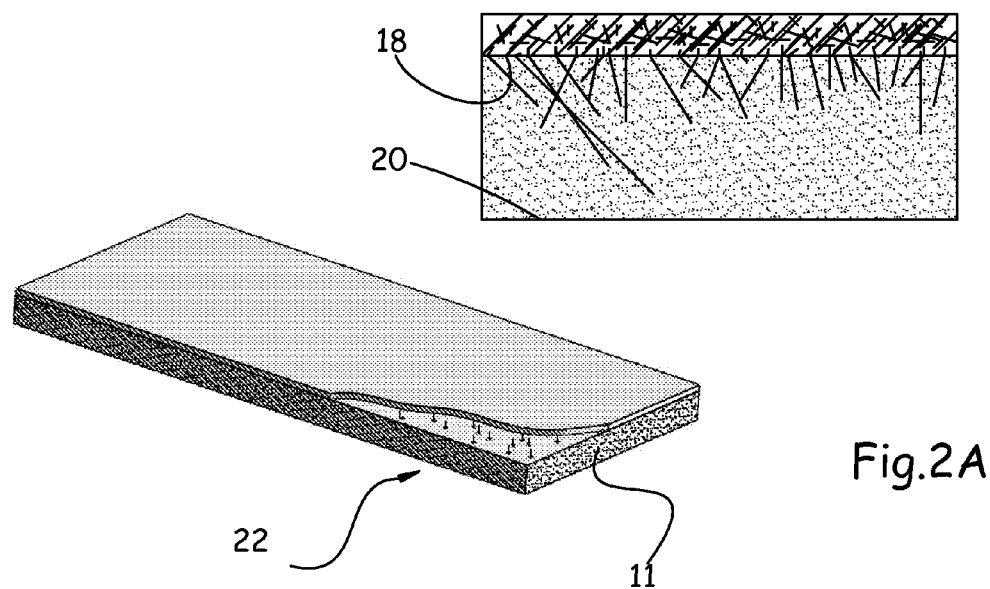

Once a portion of the bridging fibers is integrated into the core, excess bridging fibers are removed, FIG. 1D.

A core with obvious bridging fibers on at least one surface and at least partially integrated into the core is thus obtained.

According to one variant, it is also possible to provide a turning of the plate to reach the second surface 20 that faces upward to deposit excess bridging fibers, as on the surface 18.

These fibers are in turn needle-bonded to be partially integrated into the thickness of the core 11 or to pass through.

Once the fibers concerned are needle-bonded, the excess non-needle-bonded fibers are removed from the core. In this case, the fibers pass through the two sides and are partially integrated into the two sides.

In the same way, the placement of fibers, the needle-bonding and the removal of excess on each surface can be done on the two surfaces simultaneously in identical fashion. The fibers of the surface that faces downward are then held temporarily during the needle-bonding by a fabric, for example.

Figure 2B:
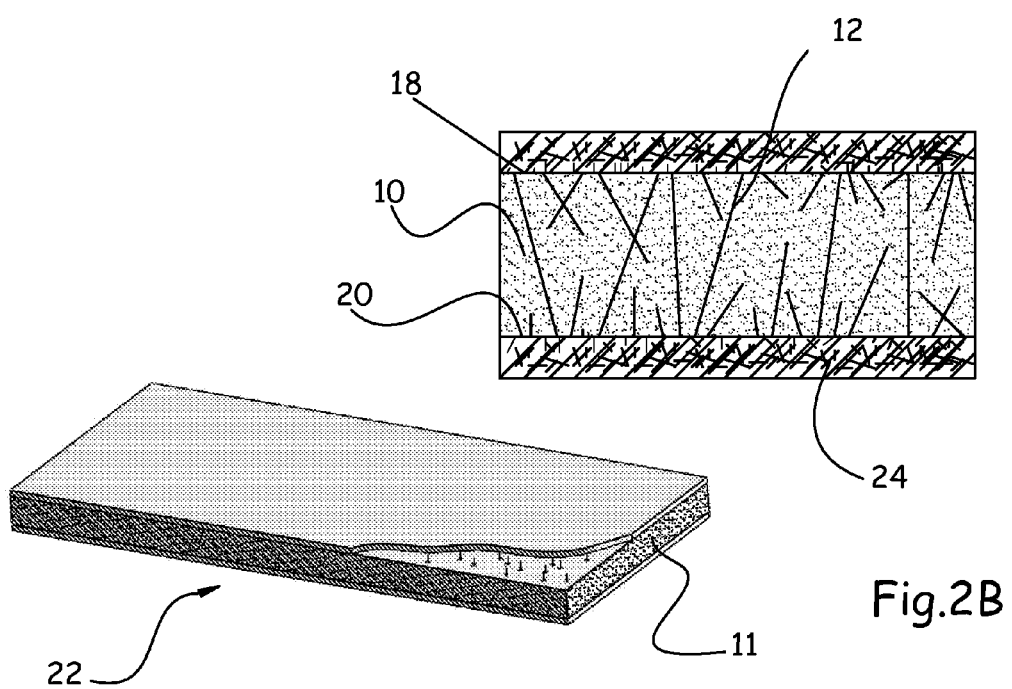
Figure 3:
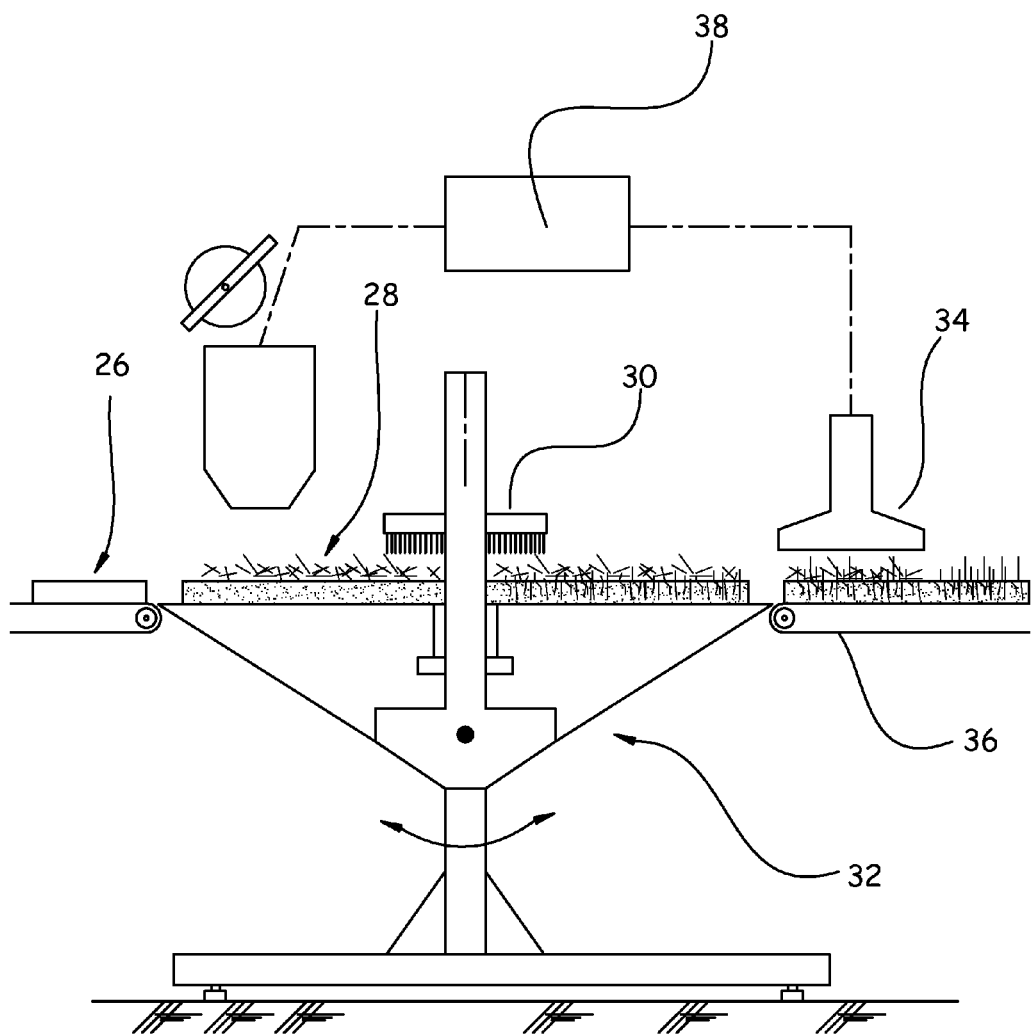

In such a way as to simplify the following description, the adopted example covers an embodiment according to which a core 10 is used with bridging fibers that completely pass through the core, obtained from each of the two surfaces, and that are visible on the two surfaces 18 and 20 of the core 10, see FIG. 2B.

Nevertheless, another example with a layer of fibers on a single surface is shown in FIG. 2A, with the bridging fibers 12 passing through and being partially integrated into the core.

Likewise, a bridging thread of a single type is selected in this example.

The thus obtained core 11, with integrated bridging fibers, is ready for the production of a panel 22.

Such a panel accommodates a layer of skin fibers 24 on each surface 18, 20.

According to a first embodiment, this layer of skin fibers 24 is manufactured in advance and deposited on each surface, with the sandwich consisting of three layers then being placed in a mold within which the resin is infused via several inputs to allow good distribution over the entire surface of the panel.

The mold is generally heated to ensure the polymerization of the resin more quickly.

It is possible, of course, to use other techniques such as that of pre-impregnated resin fibers that should be brought to temperature to ensure good diffusion in a first step and polymerization in a second step.

The selection of the technique is not a crucial point and depends on applications that are considered and equipment that is available.

According to a second embodiment, the skin fibers 24 are deposited on the two surfaces and held in place by a fabric that also ensures an excellent final surface condition after demolding.

In the first or second variant, the projecting ends of bridging fibers are taken up within the layer of skin fibers 24.

The resin in the two cases is distributed and migrates within skin fibers but also migrates into the bridging fibers that it also wets, thus producing fiber/resin composite bridges between the skin fibers of the two surfaces.

The skin fibers are selected based on mechanical performance, the surface condition to be obtained, and the quality of migration of the resin, whereas the bridging fibers are selected based on their ability to be needle-bonded, their mechanical strength, their ability to be cut, and their ability to allow the proper migration of the resin.

In the adopted embodiment that was just described by way of example, a panel is obtained with a core, two skins, one on either side of said core, and bridges between the two skins.

The thus obtained panel is particularly advantageous because it is totally optimized based on the application.

It is also noted that the manufacturing process according to this invention is advantageous in terms of management of the cores because starting from the same type of core, the panel manufacturer can combine different types of fibers for the skin, and even combinations of different types of fibers.

These skin fibers can also undergo a surface needle-bonding only with the core, without any mechanical effect, while awaiting casting in resin and polymerization.

In this case, this needle-bonding does not have any bridging role but rather a "lacing" role.

To implement the vertical needle-bonding of the bridging fibers on the core according to this invention, a device is provided that comprises:

A station 26 for supplying cake 10 that is made of light material,

A station 28 for depositing bridging fibers on each cake,

A needle-bonding station 30,

A station 32 for providing angular orientation of the cake supply station relative to the needle-bonding station, A station 34 for eliminating non-needle-bonded fibers, if any, A station 36 for removing cores 11 that are obtained with integrated bridging fibers.

Thus, it is possible to obtain a needle-bonding at an angle on both sides of the vertical axis, based on requirements.

Thus, the oblique fibers 12 work perfectly to take up forces in particular when the panel that is produced with these cores is subjected to bending, and the vertical fibers work perfectly by eliminating the risks of delamination. Of course, with the forces that are often combined, all of the bridging fibers are subjected to forces.

The supply station comprises a double conveyor belt that is used on both sides of the needle-bonding station.

The station for deposition of the fibers comprises a cutter that ensures the cutting of the thread to constitute bridging fibers.

The process according to this invention makes it possible to propose a core 11 that is prepared for the manufacturers of panels with the flexibility of possible combinations of all of the elements, namely: the nature of the cake that is made of light material, the nature of the type or types of bridging fibers, and the nature of the type or types of skin fibers.

It is also noted that it thus is possible to determine with great precision the quantity of bridging fibers and the quantity of skin fibers.

The density of bridges can also be selected and applied although it is possible to vary this density from several $m^2$ bridges to several $cm^2$ bridges.

Likewise, the geometry of placement of the bridges can be controlled with a distribution, for example, in staggered rows.

It is consequently understood that the process for production of a core according to the process of the invention makes possible all of the combinations for the manufacturing of a panel.

Actually, meeting the requirements exactly prevents over-reinforcement, unnecessary consumption of raw material, and excess weight of the finished panels that then have to be transported, for example, over millions of kilometers on the truck that is equipped therewith.

Ultimately, this limitation of raw materials also makes it possible to reduce the costs and the quantities of material to be recycled at the end of service life.

The invention claimed is:

1. A process for producing a core with integrated bridging fibers for manufacturing of composite panels, comprising:
    selecting a cake made of foam having two opposing surfaces and a core in between the opposing surfaces;
    depositing bridging fibers without any connective element onto at least one of the opposing surfaces of the cake;
    making a portion of the deposited bridging fibers penetrate through the core of the cake, in such a way that each bridging fiber of the portion is accessible on both of the opposing surfaces of the cake; and
    removing excess bridging fibers that remain on the at least one of the opposing surfaces after the portion of deposited bridging fibers have penetrated through the core.

2. The process according to claim 1, wherein needle-bonding is used to make the portion of the deposited bridging fibers penetrate into the core of the cake.

3. The process according to claim 1, wherein the bridging fibers are of different lengths.

4. The process according to claim 1, wherein the bridging fibers are segments of threads that consist of braided filament bundles.

5. The process according to claim 1, wherein the portion of deposited bridging fibers are introduced at an angle relative to the surface of the cake to make the portion of the deposited bridging fibers penetrate through the core of the cake.

6. The process according to claim 3, wherein the bridging fibers are segments of threads that consist of braided filament bundles.

7. The process according to claim 4, wherein the bridging fibers are introduced at an angle relative to the surface of the cake.

8. The process according to claim 6, wherein the bridging fibers are introduced at an angle relative to the surfaces of the cake.

* * * * *